United States Patent [19]
Odier

[11] 3,891,398
[45] June 24, 1975

[54] DISC BRAKE PADS FORMED FROM TWO SINTERED METALLIC LAYERS

[75] Inventor: Jean Odier, Antony, France

[73] Assignee: Ferodo Limited, Manchester, England

[22] Filed: Jan. 19, 1973

[21] Appl. No.: 325,034

[30] Foreign Application Priority Data
Jan. 20, 1972 France .............................. 72.01843

[52] U.S. Cl.......... 29/182.2; 75/208 R; 188/251 M; 188/73.1
[51] Int. Cl........... B22f 1/00; B22f 7/02; B22f 5/00
[58] Field of Search .................. 75/208 R; 29/182.2; 188/250 H, 250 B, 251 R, 251 A

[56] References Cited
UNITED STATES PATENTS

| | | | |
|---|---|---|---|
| 2,970,675 | 2/1961 | Biggs | 75/208 |
| 3,037,860 | 6/1962 | Masterson et al. | 75/208 |
| 3,069,758 | 12/1962 | Wulff | 75/208 |
| 3,087,814 | 4/1963 | Smiley | 75/208 |
| 3,114,197 | 12/1963 | DuBois et al. | 29/182.2 |
| 3,761,256 | 9/1973 | Strom et al. | 29/182.2 |

*Primary Examiner*—Benjamin R. Padgett
*Assistant Examiner*—B. Hunt
*Attorney, Agent, or Firm*—Cushman, Darby & Cushman

[57] ABSTRACT

A monolithic block of friction material comprises two adjacent layers formed from metallic powders and the matrices of the two layers comprise the same metal of a wear-resistant nature, for example iron or steel, the layer forming the friction lining including (i) less of this metal than the other layer forming the backing medium and (ii) a frictional and/or lubricating additive for example coke or graphite. The monolithic block is formed from the two layers of metallic powder by pressing at elevated pressure and sintering the resulting consolidated powder block.

15 Claims, No Drawings

DISC BRAKE PADS FORMED FROM TWO SINTERED METALLIC LAYERS

This invention concerns improvements in or relating to friction materials, particularly but not exclusively to friction linings for brakes.

In general, friction linings are fixed to metal backing plates, usually of steel. In the case of a disc brake, an assembly of a lining and a backing plate forms a pad which can be used inter-changeably in the brake. The lining is adapted to rub against the disc, generally of an appropriate cast iron, forming the mating surface, whilst the steel backing plate acts as a mechanically resistant element, on the one hand providing for distribution of the applied forces over the whole surface of the lining, and, on the other, laterally transmitting the resultant braking forces to the associated fixed mountings.

The lining is generally fixed to the backing plate by intermediate securing means; these may consist, for example, of a layer of adhesive, generally organic, with or without anchoring pins, with or without an electrolytic metallic deposit, with or without an intermediate metallic strengthening layer or rivets.

In each case, it is essential to avoid the lining wearing down as far as these intermediate securing means. It would be very undesirable and dangerous even for the lining wear to be such that it reaches these intermediate securing means; if it is, the securing means are no longer strong enough to hold the rest of the lining. Alternatively, the intermediate securing means come into contact with the mating surface, which results in insufficient or in too aggressive friction, and the braking effect is deleteriously affected.

It is for this reason, when wear indicators are provided, that the latter act well before the wear affects the securing means. The result is that a non-inconsiderable thickness of friction lining, for example approximately 2mm, is unusable.

An object of the present invention is to obviate or mitigate the disadvantages mentioned above.

According to the present invention there is provided a self-supporting friction material manufactured by a powder metallurgy technique and comprising a monolithic block having a first layer forming a friction lining and a second layer united therewith and forming a backing and wherein the matrix of each layer comprises a sintered wear-resistant metal powder common to both layers, the first layer comprising a smaller percentage by weight of the sintered wear-resistant metal powder than the second layer and the first layer also including an additive compatible with the sintered wear-resistant metal powder and selected from friction enhancing materials and lubricants.

By virtue of the present invention, it is possible to provide a friction material having a backing of suitable mechanical strength, by using a relatively large proportion of the said metal powder, and a friction lining of good frictional properties, by incorporating in the latter a friction enhancing material and/or a lubricant. The backing and friction lining are completely solid one with the other in monolithic fashion owing to the fact that the powders used for the two layers are compatible; this avoids the use of any intermediate securing menas and it makes it possible for the entire friction lining layer to be used.

Tests carried out on friction materials of this invention have shown that in the vicinity of the interface between the two layers the coefficient of friction has, taking into account temperature considerations, an average value close to that of the friction lining layer, whilst the nature of friction forces arising between the material of the interface and the material of the engaging member (e.g. the disc of a disc brake) causes only a slight erosion of the material of the engaging member; it is thought that this favourable effect may be due to a structural modification of the backing in the vicinity of the interface of the two layers. The present invention permits location of a wear indicator in the backing itself, rather than in the friction lining.

Further according to the present invention there is provided a process for manufacturing the self-supporting friction material aforesaid, comprising (i) placing in a mould two succesive layers of material in powder form, one adapted to form a friction lining and the other adapted to form a backing united with the friction lining, a sinterable wear-resistant metal powder being common to both layers, said one layer comprising a smaller percentage by weight of the metal powder than said other layer and said one layer comprising also an additive compatible with the metal powder; (ii) consolidating the powder layers by applying thereto a pressure within the range from $29 \times 10^3$ to $116 \times 10^3$ p.s.i. (200 to 800 MN/m²) and (iii) sintering the consolidated powder layers under a controlled atmosphere to form a monolithic block.

Sintering is preferably effected at a temperature of about 1,000°C, preferably for a period of time of from 15 minutes to 3 hours and preferably without application of mechanical pressure to the consolidated powders.

The sintered monolithic block may be subjected to an elevated pressure of less than $116 \times 10^3$ p.s.i. (800 MN/m²), after cooling.

In a preferred form of the invention the backing layer includes at least one additive adapted to improve the properties of the backing, independently of its mechanical strength, for example to improve the thermal insulation or the friction properties in the event of possible friction with material of the engaging member (for example the brake disc) with which the friction material is to frictionally engage.

The preferred wear-resistant metal is iron or steel, but other metals and alloys may be used as an alternative.

It will be appreciated that the interface of the two layers may be parallel with the friction face; alternatively it may have quite a different orientation or shape, for example (and preferably) a boat-shape where the backing layer is raised at the edges in order to avoid the risk of chipping of the friction lining. In this case, in the powder forming the backing layer it is preferred to provide for reduced friction by inclusion of an additive such as a lubricant, for example graphite. The term "reduced" friction means reduced sufficiently to obviate damage to the engaging member or backing in the event of engagement occurring.

The "interface" of the two layers referred to above may have a slight or a considerable thickness, for example 1mm, by deliberate local mixture of the two powders.

The manufacturing technique used in this invention permits virtually any geometrical shape for the backing, for example the provision of a structure favouring the dissipation of heat into the ambient air, such as fins, or a honeycomb effect.

In the most preferred embodiments of this invention, the powders of the two layers have the following composition by weight:

|  | powder of the backing layer | powder of the friction lining layer |
|---|---|---|
| Iron | 80 to 99% | 35 to 80% |
| Nickel and/or Chromium | 0 to 5% | 1 to 22% |
| Copper | 0 to 3% | 0.3 to 15% |
| Coke | 0 to 5% | 5 to 20% |
| Graphite | 1 to 10% | 8 to 20% |
| Silica or Alumina | 0 to 15% | |

The following examples are given to illustrate preferred embodiments of the invention.

EXAMPLE 1

In order to make a self-supporting friction lining forming a disc brake pad assembly, there were arranged in a mould in two successive layers, a first powder corresponding to the backing layer of the pad and a second powder corresponding to the friction lining medium of the pad.

The first powder had the following composition by weight:

| Iron | 99% |
|---|---|
| Graphite | 1% |

The second powder had the following composition by weight:

| Iron | 75% |
|---|---|
| Nickel | 1% |
| Copper | 6% |
| Coke | 8% |
| Graphite | 10% |

The two powders had a plane interface.

The two layered powders were consolidated under a pressure of about $101.5 \times 10^3$ p.s.i. (700 MN/m$^2$). The resulting mass was sintered in a reducing atmosphere without application of pressure for one and a half hours, at a temperature of about 1,000°C. The resultant block was then re-compressed under a pressure of $72.5 \times 10^3$ p.s.i. (500 MN/m$^2$).

In this way a disc brake pad constituting a monolithic block comprising a self-supported friction lining was obtained.

Macroscopic examination of a polished cross section showed evidence of an interpenetration of the two layers of 0.46mm. A micrographic examination of a polished cross section etched with a standard reagent showed a structural change in the backing layer at a depth of 1mm below the interface of the two layers.

Tests have shown the good performance of this pad during braking; moreover it was possible to use the friction lining layer completely, without any inconvenience.

EXAMPLE 2

The procedure was the same as in Example 1 but the first powder corresponding to the backing layer medium of the pad had the following composition by weight:

| Steel wool | 81% |
|---|---|
| Copper | 3% |
| Graphite | 1% |
| Alumina | 15% |

Alumina was used to improve the thermal insulation and minimise the risk of an excessive transfer of heat, in the course of friction, to the brake control device.

The interface of the two layers had a thickness of 1 millimetre, by allowing deliberate local mixture of the two powders.

EXAMPLE 3

The procedure was the same as in Example 1 but the first powder corresponding to the backing layer medium of the pad had the following composition by weight:

| Iron | 86% |
|---|---|
| Nickel | 4% |
| Copper | 3% |
| Graphite | 4% |
| Coke | 3% |

Tests showed that when the friction lining had been completely used, the backing layer medium did not erode the material of the brake disc.

In this Example, the backing layer was formed with cooling fins on its back surface.

EXAMPLE 4

The procedure was the same as in Example 1 but the first powder corresponding to the backing layer medium of the pad had the following composition by weight:

| Steel | 80% |
|---|---|
| Copper | 3% |
| Graphite | 10% |
| Nickel | 5% |
| Silica | 2% |

This pad had a good mechanical strength and adequate friction qualities.

A wear indicator was located in the backing layer at the level of the interface of the two layers, after manufacture of the pad itself.

EXAMPLE 5

The procedure was the same as in Example 1 but the first powder corresponding to the backing medium of the pad had the following composition by weight:

| Iron | 93.5% |
|---|---|
| Nickel | 1.5% |
| Graphite | 5% |

This pad exhibited a very good mechanical strength.

EXAMPLE 6

The procedure was the same as in Example 1, but the first powder corresponding to the backing medium of the pad had the following composition by weight:

| | |
|---|---|
| Steel wool | 88% |
| Copper | 5% |
| Coke | 5% |
| Graphite | 1% |
| Nickel | 1% |

This pad exhibited a good mechanical strength and a good behaviour with regard to the material of the mating surface of the brake.

EXAMPLE 7

The procedure was the same as in Example 1 but the second powder corresponding to the friction lining medium had the following composition by weight:

| | |
|---|---|
| Iron | 35% |
| Nickel | 19% |
| Chrome | 3% |
| Copper | 13% |
| Coke | 10% |
| Graphite | 20% |

EXAMPLE 8

The procedure was the same as in Example 1, but the second powder corresponding to the friction lining medium had the following composition by weight:

| | |
|---|---|
| Iron | 54% |
| Chrome | 1% |
| Copper | 15% |
| Coke | 20% |
| Graphite | 10% |

EXAMPLE 9

The procedure was the same as in Example 1, but the second powder corresponding to the friction lining medium had the following composition by weight:

| | |
|---|---|
| Iron | 80% |
| Nickel | 6.5% |
| Copper | 0.5% |
| Coke | 5% |
| Graphite | 8% |

What we claim is:

1. A monolithic self-supporting disc brake pad consisting essentially of two consolidated layers of sintered metallic powder, wherein (i) a first of said layers forms the friction lining of the pad, (ii) the second of said layers forms the carrier plate of the pad, (iii) the matrix of each layer comprises a sintered wear-resistant metal powder common to both layers, and (iv) the first layer comprises a smaller percentage by weight of the sintered wear-resistant metal powder than the second layer and also comprises a friction enhancing or lubricant additive compatible with the sintered wear-resistant metal powder.

2. A disc brake pad according to claim 1, wherein the carrier plate layer has a greater depth at its edges than towards or at its center.

3. A disc brake pad according to claim 1 wherein the materials forming the layers have been deliberately mixed at the interface of the layers.

4. A disc brake pad according to claim 1, wherein the carrier plate layer is provided with a structure favoring dissipation of heat into the ambient atmosphere.

5. A disc brake pad according to claim 1, including a wear indicator located in the carrier plate layer at the level of the interface between the carrier plate and friction lining layers.

6. A friction material according to claim 1, having the following composition:

| | Powder of the carrier plate layer | Powder of the friction lining layer |
|---|---|---|
| Iron | 80 to 99% | 35 to 80% |
| Nickel and/or Chromium | 0 to 5% | 1 to 22% |
| Copper | 0 to 3% | 0.3 to 15% |
| Coke | 0 to 5% | 5 to 20% |
| Graphite | 1 to 10% | 8 to 20% |
| Silica or alumina | 0 to 15%. | |

7. A disc brake pad as claimed in claim 1, produced by a powder metallurgy technique which comprises (i) placing in a mould two successive layers of material in powder form, one adapted to form a friction lining and the other adapted to form a carrier plate, a sinterable wear resistant metal powder being common to both layers, said one layer comprising a smaller percentage by weight of the metal powder than said other layer and said one layer comprising also an additive compatible with the metal powder; (ii) consolidating the powders layers by applying thereto a pressure within the range from $29 \times 10^3$ to $116 \times 10^3$ p.s.i. (200 to 800 MN/m$^2$) and (iii) sintering the consolidated powder layers under a controlled atmosphere to form a monolithic block.

8. A disc brake pad according to claim 7, wherein sintering has been effected at a temperature of about 1,000° C.

9. A disc brake pad according to claim 7, wherein sintering has been effected for a period of from 15 minutes to 3 hours.

10. A disc brake pad according to claim 7, wherein sintering has been effected in the absence of an applied mechanical pressure.

11. A disc brake pad according to claim 7, wherein the sintered block has been subjected to an elevated pressure of less than $116 \times 10^3$ p.s.i. (800 MN/m$^2$), after cooling.

12. A monolithic disc brake pad according to claim 1, wherein the carrier plate layer incorporates an additive which improves the friction properties thereof.

13. A monolithic disc brake pad according to claim 1, wherein the carrier plate layer incorporates an additive which improves the thermal insulation thereof.

14. A disc brake pad according to claim 12, wherein the additive incorporated in the carrier plate layer is selected from the group consisting of coke and graphite.

15. A disc brake pad according to claim 13, wherein the additive incorporated in the carrier plate layer is selected from the group consisting of silica and alumina.

* * * * *